United States Patent
Brans

(10) Patent No.: US 6,848,721 B2
(45) Date of Patent: Feb. 1, 2005

(54) TELESCOPIC CONNECTOR FOR VEHICLE BRAKE CONDUIT

(75) Inventor: Johannes M. Brans, Helmond (NL)

(73) Assignee: Johannes Gerardus Michel Bernards, Helmond (NL)

( * ) Notice: Subject to any disclaimer, the term of this patent is extended or adjusted under 35 U.S.C. 154(b) by 0 days.

(21) Appl. No.: 10/203,863
(22) PCT Filed: Feb. 9, 2001
(86) PCT No.: PCT/NL01/00107
§ 371 (c)(1), (2), (4) Date: Aug. 14, 2002
(87) PCT Pub. No.: WO01/64492
PCT Pub. Date: Sep. 7, 2001

(65) Prior Publication Data
US 2003/0042738 A1 Mar. 6, 2003

(30) Foreign Application Priority Data
Feb. 28, 2000 (NL) .............................. 1014510

(51) Int. Cl.⁷ ............................................... F16L 27/12
(52) U.S. Cl. .................................... 285/302; 285/121.1
(58) Field of Search ................................ 285/298, 302, 285/123.6, 123.2, 123.12, 123.14, 121.2

(56) References Cited

U.S. PATENT DOCUMENTS

| | | | | |
|---|---|---|---|---|
| 2,402,157 A | * | 6/1946 | Griswold | 285/302 |
| 2,455,334 A | * | 11/1948 | Hill et al. | 285/302 |
| 2,664,271 A | * | 12/1953 | Arutunoff | 285/302 |
| RE27,224 E | * | 11/1971 | Parrett | 285/302 |
| 4,099,670 A | * | 7/1978 | Cole et al. | 285/302 |
| 4,652,024 A | * | 3/1987 | Krohn | 285/302 |
| 5,772,259 A | * | 6/1998 | Geary et al. | 285/302 |

* cited by examiner

Primary Examiner—David Bochna
(74) Attorney, Agent, or Firm—Ladas & Parry LLP

(57) ABSTRACT

A constant volume brake circuit connector for use inside a variable length front fork of a motorcycle includes a first tube and a second tube coaxially inside the first tube. The first tube is longer and wider than the second tube and defines a space between corresponding ends of the first and second tubes. The space is connected to an inlet. A core tube is axially displaceable inside the first and second tubes, extending through the space, and includes a central bore and a cross bore connection to the space. The total volume of the space, the central bore, and the cross bore connection is constant.

3 Claims, 1 Drawing Sheet

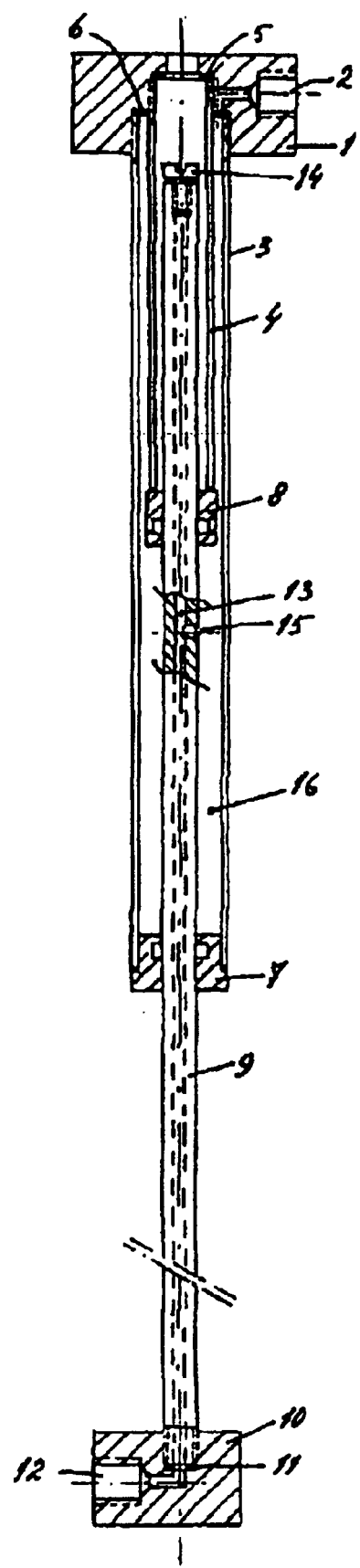

TELESCOPIC CONNECTOR FOR VEHICLE BRAKE CONDUIT

The invention concerns a connector to connect two parts of a brake conduit where the connector permits axial movement without variation of the volume of the conduit. The connector is used in the suspension fork of a motorcycle. The brake circuit is the hydraulic connection between a handle and the brake cylinder of the front wheel. The connector makes it possible to integrate the brake circuit into a leg of the fork. The variation in length is necessary to compensate the suspension movement of the fork.

The front wheel brake of a motorcycle is the most important brake element as motorcycles when braking duck to front while the pressure on the rear wheel decreases. Because the front brake is manual operated, it is of great importance that the brake force is very exact transmitted.

With known systems the hydraulic pressure is transmitted with hoses. These have the disadvantage of being more or less flexible so the brake force is not constant transmitted by change in volume of the hose. To compensate the suspension of the fork one needs room and in many cases the hoses stick out of the motorcycle.

A constant volume connector is known from U.S. Pat. No. 5,011,195. This application uses three seals with three different diameters acting on two outer and one inner diameter. The constant volume of the appliance is created by a plunger which compensates the variation of volume when axial moving. This application uses also an outer conduit for the fluid compensation. The ventilated space can accumulate dirt and fluid.

The invention aims at a brake circuit connector which can be mounted in the center of the leg. Because of the permitting of axial movement without variation of the volume of the circuit the brake conduit can completely be built in. Because of the absence of hoses the brake circuit is very direct in the transmitting of the brake force. Also protruding parts are completely avoided.

The invention is described with the help of the drawing.

FIG. 1 shows a cross section in length of the connector.

To enhance the clarity of the drawing shading of the two tubes is refrained.

At (1) is indicated the block with inlet connection (2) where tube (3) and tube (4) are screwed in. Tube (3) and tube (4) are sealed with seal (5) and (6). Tube (3) is connected with seal-ring (7) with seal and tube (4) is connected with seal-ring (8) with seal. Through seal-rings (7) and (8) passes core-tube (9) which is on one side connected with connection block (10) and is sealed with seal-ring (11). At (12) is the outlet connection which is connected by borings with boring (13). Core-tube (9) has boring (13) which is closed on the other side with screw (14). At (15) is in core-tube (9) a cross boring (15) foreseen.

Tube (3) is longer and wider than tube (4). The inside of tube (3) is connected with inlet connection (2). By the difference of length between tube (3) and (4) comes into being space (16). The length of space (16) correspond to the variation in length of the connector. By cross boring (15) space (15) is connected with boring (13).

When core-tube (9) moves axial the total volume of the brake circuit will not change because the diameter of seals in seal-ring (7) and (8) are having the same diameter.

What is claimed is:

1. A variable length axial connector for a motorcycle brake conduit comprising:
    means defining a sealed constant-volume space connected with an inlet connection; and
    a core-tube axially moveable within the sealed space, said core tube including a cross boring connected with said sealed space and a central boring connected with an outlet block,
    wherein said means defining said sealed constant volume space comprises a first tube and a second tube, each said tube mounted in an inlet block, a first sealing-ring in said first tube and a second sealing-ring in said second tube, wherein said core-tube is sealed and fitted in said sealing-rings in said first and second tubes, and wherein said space is connected to said inlet connection and to said outlet block via said core-tube and said cross boring.

2. A connector for a brake conduit for use inside a variable length front fork of a motorcycle, said brake circuit connector comprising:
    a first tube and a second tube axially inside said first tube;
    means including said first tube being longer and wider than said second tube for defining a sealed space between corresponding ends of said first tube and said second tube, said sealed space being connected to an inlet; and a core tube with a first end inside said second tube and extending from inside said second tube through said sealed space to a second end projecting axially out of said first tube, said core tube being axially and sealingly displaceable within said second tube and said sealed space, said core tube having a central bore and a cross bore connecting said central bore to said sealed space,
    whereby the total volume of the sealed space, the central bore, and the cross bore connection is constant.

3. The connector according to claim 2, wherein
    said first tube is sealed by a first seal, said second tube is sealed by a second seal, such that said sealed space is between said first and second seals, said core tube extending from said second tube through said second seal into said sealed space, and extending from said sealed space through said first seal to project axially out of said first tube,
    said first tube includes an end opposite said first seat that is mounted in an inlet block, said second tube includes an end opposite said second seal that is mounted in said inlet block, and wherein said second end of said core tube connects to an outlet block.

* * * * *